United States Patent [19]

Eckert

[11] 4,440,124
[45] Apr. 3, 1984

[54] INTERNAL COMBUSTION ENGINE

[75] Inventor: Konrad Eckert, Stuttgart, Fed. Rep. of Germany

[73] Assignee: Robert Bosch GmbH, Stuttgart, Fed. Rep. of Germany

[21] Appl. No.: 410,822

[22] Filed: Aug. 23, 1982

[30] Foreign Application Priority Data

Feb. 27, 1982 [DE] Fed. Rep. of Germany ....... 3207179

[51] Int. Cl.³ .............................................. F02B 19/12
[52] U.S. Cl. .................................... 123/261; 123/254; 123/256; 123/260; 123/262
[58] Field of Search ............... 123/260, 261, 262, 275, 123/277, 256, 263, 266, 254

[56] References Cited

U.S. PATENT DOCUMENTS

| 2,685,869 | 8/1954 | Fenney et al. | 123/263 |
| 3,304,922 | 2/1967 | Hideg | 123/260 |
| 3,443,552 | 5/1969 | Von Seggern et al. | 123/262 |
| 4,050,420 | 9/1977 | Cataldo | 123/260 |
| 4,085,713 | 4/1978 | Noguchi et al. | 123/261 |
| 4,332,224 | 6/1982 | Latsch et al. | 123/263 |
| 4,350,125 | 9/1982 | Kanda et al. | 123/260 |

FOREIGN PATENT DOCUMENTS 105157 4/1917 United Kingdom ................ 123/275

Primary Examiner—Andrew M. Dolinar
Attorney, Agent, or Firm—Michael J. Striker

[57] ABSTRACT

An internal combustion engine has a cylinder with a movable piston and a cylinder head, a main combustion chamber and an additional combustion chamber, elements producing a twisted stream rotating about an axis of the additional combustion chamber, an injecting nozzle opening in an aspirating passage, and an external igniting device, wherein the injecting nozzle is formed as a single-hole injecting nozzle and has an injection hole which is directed substantially against the igniting device.

7 Claims, 6 Drawing Figures

INTERNAL COMBUSTION ENGINE

BACKGROUND OF THE INVENTION

The present invention relates to an internal combustion engine which has at least one cylinder and a piston, and is provided with an external igniting means.

Internal combustion engines of the above mentioned general type are known in the art. One such internal combustion engine is disclosed, for example, in German Offenlegungsschrift No. 2,757,648. It has at least one cylinder, a piston movable in the cylinder, a combustion chamber between the piston and a cylinder head connected with the cylinder, and an additional internal combustion chamber connected with the first mentioned combustion chamber and arranged so that it has a round periphery and ends at an inlet valve, an injecting nozzle, igniting means formed as an ignition plug, and means for producing a twisted stream extending into the additional combustion chamber. The injecting nozzle opens into an aspirating conduit which guides the inlet valve and is formed as a multiple-hole nozzle. It injects several fuel jets, advantageously at the end of a respective aspiration step via the opened inlet valve into the additional combustion chamber. The ignition plug is arranged at the periphery of the additional combustion chamber. Because of the approximately uniform distribution of the fuel relative to the periphery of the additional combustion chamber, the fuel quantity in its greater part is entrained by air flowing into the cylinder to the same. For reliably igniting the fuel-air mixture, it is necessary to have a limited air surplus at least in the region of the igniting means. The known internal combustion engines can operate only with a low average air surplus or only with a low admixture of waste gas from the outlet. In these internal combustion engines the aspiration conduit is designed so that it serves as a means for generating a twisted stream during flowing in of air in the additional combustion chamber. Another means for generating a stream flowing into the additional combustion chamber and having a twist is known from German Offenlegungsschrift No. 3,008,124 and includes a gas guiding groove which is formed at a piston side directed to the cylinder head. At the end of a compression stroke it leads a stream from a cylinder formed by air or air-containing mixture with a tangential component into the additional combustion chamber and at its periphery. The twist in the additional combustion chamber acts so that the specifically heavier components of a mixture are displaced from fuel, air and in some cases waste gas toward the periphery of the combustion chamber, which leads to a fuel enrichment of the mixture along the periphery of this combustion chamber. In the known displacement piston combustion chamber machines, this enrichment of the fuel is limited to the region of the above mentioned periphery, inasmuch as, as described hereinabove, the great part of the injected fuel is entrained in the cylinder and during a subsequent compression stroke only a part is supplied back to the additional combustion chamber. The action of the centrifugal force is, however, too small to direct the supplied back fuel in the additional combustion chamber sufficiently to the periphery of the additional combustion chamber. The higher the temperature in the cylinder increases after the start of the internal combustion engine, the lower is the concentration of fuel at the periphery of the additional combustion chamber.

There is a possibility, described in U.S. Pat. No. 4,182,280, to arrange an injecting nozzle at the periphery of the additional combustion engine, and to inject fuel directly into this chamber during the compression stroke of the internal combustion engine. This results in an embossed layer of charge and has the disadvantage that the injecting nozzle is exposed to flames, whereby it is fast coked and changed, and is formed as an expensive high-pressure injecting nozzle and connected with a high-pressure injection pipe.

SUMMARY OF THE INVENTION

Accordingly, it is an object of the present invention to provide an internal combustion engine which avoids the disadvantages of the prior art.

In keeping with these objects, and with others which will become apparent hereinafter, one feature of the present invention resides in an internal combustion engine in which an injecting nozzle is formed as a single-hole injecting nozzle, and an injecting hole of the single-hole injecting nozzle is directed substantially against the igniting means of the engine.

In the inventive internal combustion engine with arrangement of the injecting nozzle in an aspirating tube, the engine can operate with high average air surplus and/or with raised gas admixture or reducing the consumption and undesirable components such as nitrogen oxide in waste gas.

The injecting nozzle can be formed in a known manner as a price-favorable low-pressure injecting nozzle and supplied with fuel from an inexpensive low-pressure pump.

In accordance with other features of the present invention, the igniting means can be formed as an ignition plug with electrodes extending at the periphery of the additional combustion chamber.

The electrodes of the ignition plug can be arranged in a recess which is provided at the periphery of the additional combustion chamber.

The recess can be formed as an end portion of an igniting means receiving hole, the end portion facing toward the combustion chamber.

The ignition means can be formed as an ignition chamber plug having a chamber with a first opening directed substantially against an injecting hole of the injecting nozzle, and a second opening directed substantially to the periphery of the additional combustion chamber and substantially in a direction of rotation of the twisted stream.

Finally, means can be provided for tempering the ignition chamber of the ignition chamber plug.

These additional features of the present invention provide for a possibility to arrange and design the igniting means so that in dependence upon the evaporating properties of a fuel used and the expected speed, the twisted stream in the region of the igniting means, as well as the time periods between the closing of the inlet valve and the igniting point, can be selected.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

DESCRIPTION OF THE PREFERRED EMBODIMENTS

Figure 1:
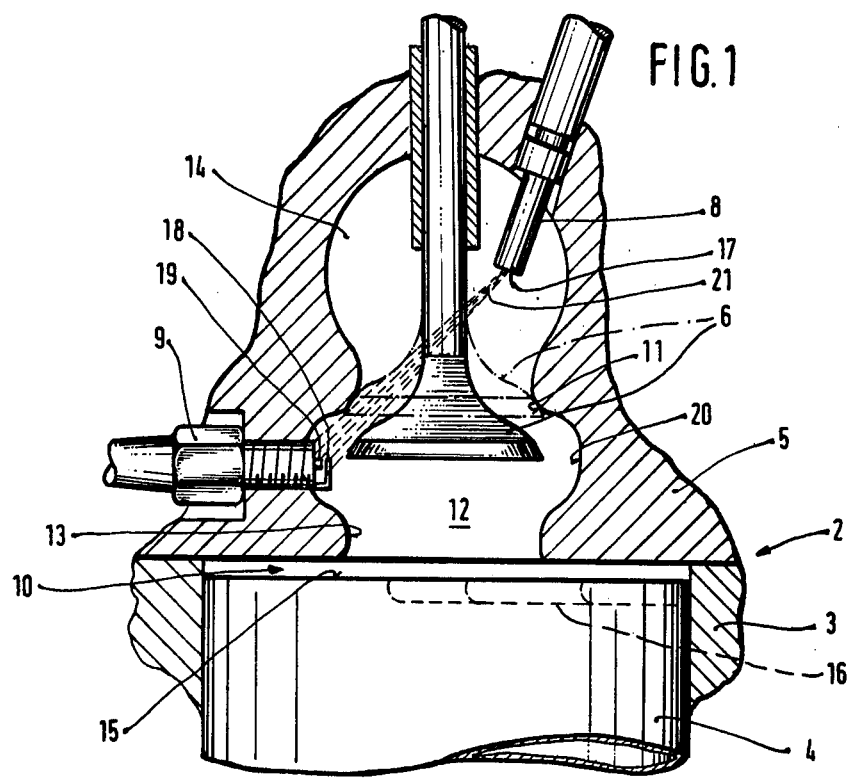
FIG. 1 is a longitudinal section of an internal combustion engine in accordance with the present invention.
Figure 2:
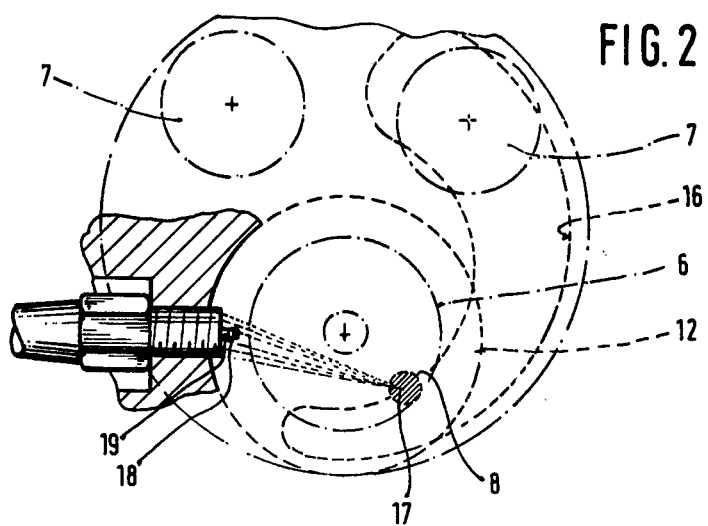
FIG. 2 is a plan view of the internal combustion engine of FIG. 1.

An internal combustion engine shown in FIGS. 1 and 2 is identified by reference numeral 2 and has at least one cylinder 3 with a raisable and lowerable piston 4, a cylinder head 5 connected with the cylinder 3, an inlet valve 6 arranged in the cylinder head 5, two outlet valves 7, an injecting nozzle 8, and an external igniting means 9.

A combustion chamber 10 is formed between the piston 4 and the cylinder head 5 inside the cylinder 3. The inlet valve 6 is arranged inside the cylinder head 5 and associated with a valve seat 11. An additional combustion chamber 12 adjoins the valve seat 11 and extends in a direction of the cylinder 3. The additional combustion chamber 12 is advantageously formed rotation-symmetrical and arranged concentric to the valve seat 11, and connected with the combustion chamber 10.

The diameter of the additional combustion chamber 10 is greater than its height. A transition 13 is provided between the additional combustion chamber 12 and the combustion chamber 10 and is formed as a restriction. An aspirating passage 14 is located above the valve seat 11 and ends at the latter. The aspirating passage 14 is designed in a known manner so that, with the open inlet valve 6 and the upwardly displaced piston 4, a quantity of air which flows into the additional combustion chamber 12 and the combustion chamber 10 is deflected so that this quantity of air flows with a twist into the additional combustion chamber 12.

The piston 4 has at its side 15 facing toward the cylinder head 5 a gas-guiding groove 16. During a compression stroke of the piston 4, air travelling in the direction of the cylinder head 5 flows partially through the gas-guiding groove 16 to the transition 13 and finally into the additional combustion chamber 12. The gas-guiding groove 16 is designed at its end leading to the transition 13 such that air flowing to the transition 13 is twisted. Because of the arrangement of the gas-guiding groove 16, the twist amplification provided by the aspirating passage 14 can be maintained low. This has the advantage that only low pressure drop in the aspirating passage 14 is required for twist formation, and the combustion chambers 10 and 12 are automatically sufficiently filled with air in the event of high rotary speed of the internal combustion engine.

The injecting nozzle 8 extends into the aspirating passage 14. It has an injecting hole 17 through which the quantity of fuel to be injected is pumped substantially in the form of a compact jet. For this purpose the injecting nozzle 8 is connected in a known manner with a not shown injection pump. The external igniting means 9 is formed as a standard ignition plug with a mass electrode 18 and an insulated electrode 19. The external igniting means 9 is directed toward the periphery 20 of the additional combustion chamber 12 so that its electrodes 18 and 19 extend into the combustion chamber 12.

The injecting nozzle 8 and its injecting hole 17 are so directed that, with the opened inlet valve 6, a fuel jet 21 reaches a zone around the electrodes 18 and 19. Thereby an undesirable flooding of the electrodes 18 and 19 with fuel is prevented, which precludes interruption of ignition. The fuel deposits in the region of the electrodes 18 and 19 on the igniting means 9 and the periphery 20 of the additional combustion chamber 12. The twisted stream rotating in the peripheral direction of the additional combustion chamber 12 and composed of the aspirated air, and in some cases a waste gas admixture, receives the fuel deposited on the periphery 20 and the igniting means 9. This process is supported in the operationally warm internal combustion engine by the temperature received by the cylinder head 5.

Because of the arrangement of the injecting nozzle and its injecting hole 17 it is guaranteed that, by the time point at which the ignition spark must take place, a sufficient quantity of fuel is available on the electrodes. At a distance from the igniting means or the periphery 20 of the additional combustion chamber 12, the portion of fuel in the air is substantially smaller, inasmuch as a flame extending fast from the igniting means widens and reliably inflames the remaining quantity of fuel.

Figure 3:
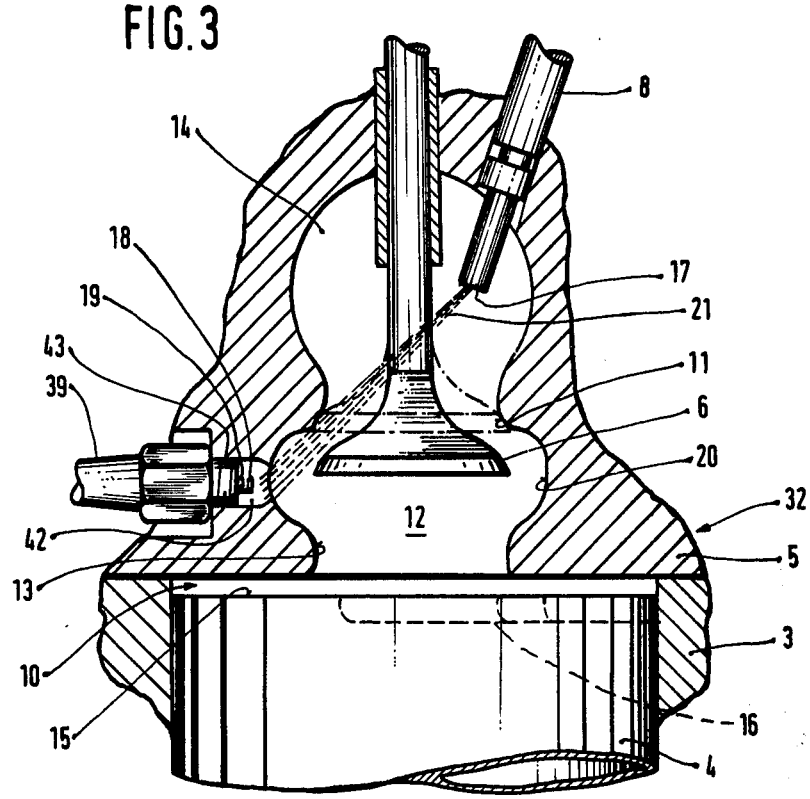
FIG. 3 is a longitudinal section of an internal combustion engine in accordance with another embodiment of the invention.
Figure 4:
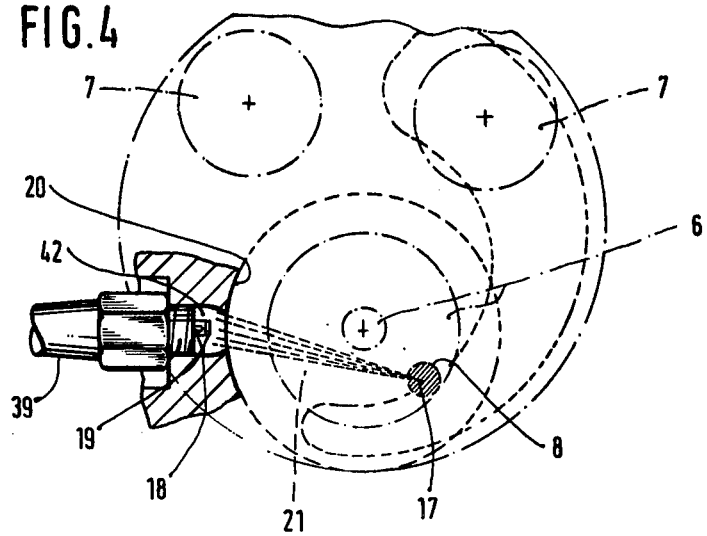
FIG. 4 is a plan view of the internal combustion engine of FIG. 3.

An internal combustion engine shown in FIGS. 3 and 4 is identified by reference numeral 32 and has an external igniting means 39 which is arranged so that its electrodes 18 and 19 are directed outside the periphery 20 of the additional combustion chamber 12. For this purpose a recess extends from the periphery 20. The recess is formed as an extension of a receiving hole 43 in which the igniting means 39 is received. The fuel jet 21 exiting from the injecting nozzle 8 reaches the recess 42 which acts as a fuel accumulator. Thereby it is guaranteed that even in the event of volatile fuels in the time period between the end of the injecting step or closing of the inlet valve 6 and the ignition time point, a sufficient quantity of fuel in air surrounding the electrodes 18 and 19 is available for a reliable first igniting. A small whirl can be formed in the recess 42 and accelerates the air flowing along the periphery 20. This small whirl receives fuel and forms a mixture volume which is easily inflammable and forms an ignition torch directed toward the additional combustion chamber 12.

Figure 5:
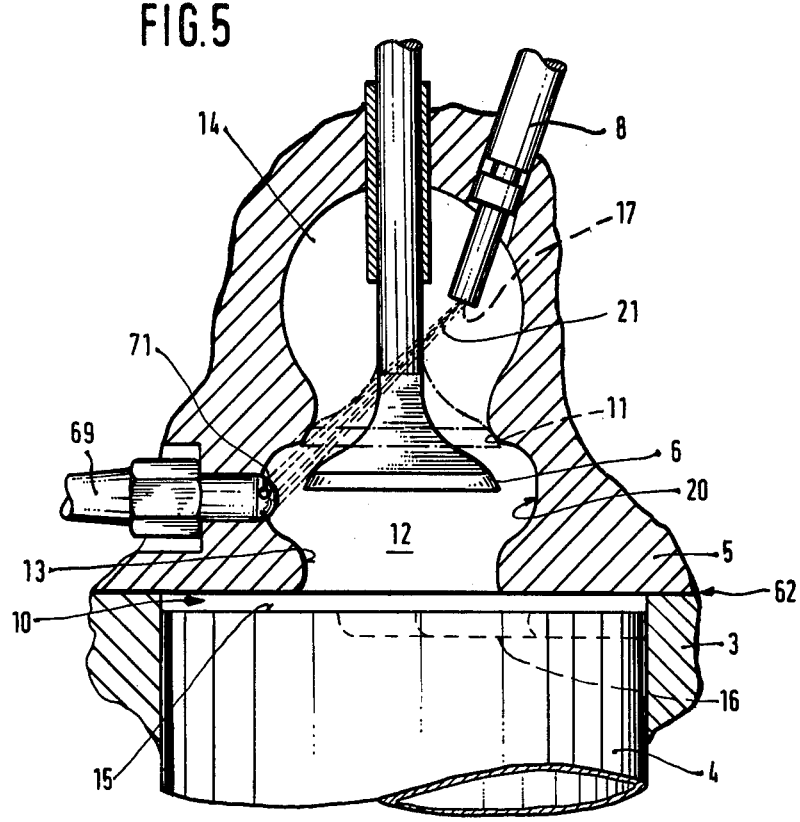
FIG. 5 is a view showing a longitudinal section of an internal combustion engine in accordance with a further embodiment of this invention.
Figure 6:
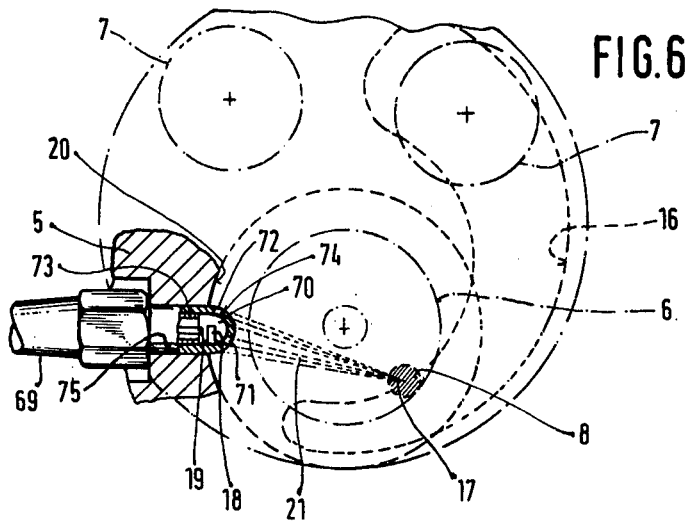
FIG. 6 is plan view of the internal combustion engine of FIG. 5.

An internal combustion engine shown in FIGS. 5 and 6 is identified by reference numeral 62 and has an igniting means 69 which is formed as an ignition chamber plug. The ignition chamber plug has an ignition chamber 70 with a first opening 71 and a second opening 72, a ground electrode 18 and an insulated electrode 19.

The opening 71 is directed substantially in direction of the injecting hole 17 of the injecting nozzle 8. The opening 72 opens in the additional combustion chamber 12 near its periphery 20 in a direction which extends substantially downstream of air flowing along the periphery 20. Advantageously, a tempering means 73 is arranged inside the ignition chamber 70. This tempering means 70 includes, for example, evaporating media-filled hollow spaces and/or heating resistors, as disclosed for example in German Offenlegungsschrift No. 2,715,953.

Fuel which is injected at the end of a suction stroke with the aid of the injecting nozzle 8 in direction of the igniting means 69 travels with its one part via the openings 71 into the ignition chamber 70. Inside the ignition chamber, an ignitable mixture of the fuel and air is formed and ignited with the aid of the electrodes 18 and 19. The inflammation of the mixture acts so that the ignition torches exit from the openings 71 and 72. The ignition torch exiting from the opening 72 ignites in the vicinity of the periphery 20 the mixture which at the periphery 20 is enriched with fuel in such a quantity which is not introduced in the ignition chamber. The ignition torch from the opening 71 increases the fuel air mixture which has a greater distance from the periphery 20.

The tempering means 73 serves for the purpose that in a short time after the start of the cold internal combustion engine an ignition-favorable mixture of fuel and air is formed inside the ignition chamber. The tempering means serves, on the other hand, also for the purpose that during normal operation of the internal combustion engine an overheating of the ignition chamber 7 and the electrode 18 and 19 is avoided and glow ignition is prevented. The ignition chamber 70, the electrodes 18 and 19, and the tempering means 73 are located inside a housing 74 which is inserted in a receiving opening 74 of the cylinder head, is brought in an advantageously determined rotary alignment, and secured in this alignment with the aid of a not shown clamping center rest, or the like.

As mentioned above, a selection of the combustion chamber 12 with the igniting means 9, 39, 69 depends upon the evaporation properties of the fuel to be used, the peripheral speed of the twist in the additional combustion chamber 12, and the rotary speed ranges in which the internal combustion engine can have the minimum specific conduction.

It will be understood that each of the elements described above, or two or more together, may also find a useful application in other types of constructions differing from the types described above.

While the invention has been illustrated and described as embodied in an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An internal combustion engine, comprising at least one cylinder; a piston movable in said cylinder; a cylinder head connected with said cylinder; an aspiration passage; an inlet valve movable between open and closed positions; a combustion chamber formed on said piston at a side of said cylinder head; an additional combustion chamber form in said cylinder head between said first mentioned combustion chamber and said inlet valve and having an axis and a circular periphery; means for producing a twisted stream rotating about said axis; an injecting nozzle which opens in said aspirating passage and is arranged to inject fuel into said additional combustion chamber via said inlet valve in its open position; and external igniting means arranged in the region of said periphery of said additional combustion chamber, said injecting nozzle being formed as a single-hole nozzle and having an injection hole which is directed substantially against said igniting means.

2. An internal combustion engine as defined in claim 1, wherein said igniting means includes an ignition plug having electrodes which extend at the periphery of said additional combustion chamber.

3. An internal combustion engine as defined in claim 1, wherein said additional combustion chamber has at its periphery a recess, said igniting means including an ignition plug with electrodes arranged in said recess of said additional combustion chamber.

4. An internal combustion engine as defined in claim 3; and further comprising means forming a hole for receiving said igniting means, said hole having an end portion which faces toward said additional combustion chamber and forms said recess.

5. An internal combustion engine as defined in claim 4, wherein said additional combustion chamber has a wall, said hole for receiving said igniting means being formed in said wall of said additional combustion chamber.

6. An internal combustion engine as defined in claim 1, wherein said igniting means is formed as an ignition chamber plug, said ignition chamber plug having a chamber with a first opening directed substantially towards said injection hole of said injecting nozzle and a second opening directed substantially toward the periphery of said additional combustion chamber and substantially in a direction of rotation of the twisted stream.

7. An internal combustion engine as defined in claim 6; and further comprising means for tempering said ignition chamber.

* * * * *